United States Patent
Hoyt et al.

(10) Patent No.: US 9,016,635 B2
(45) Date of Patent: Apr. 28, 2015

(54) TERMINATOR TAPE SATELLITE DEORBIT MODULE

(75) Inventors: Robert Hoyt, Kirkland, WA (US); Ian Barnes, Kirkland, WA (US); Nestor Voronka, Seattle, WA (US); Jeffrey Thor Slostad, Lynnwood, WA (US)

(73) Assignee: Tethers Unlimited Inc, Bothell, WA (US)

( * ) Notice: Subject to any disclaimer, the term of this patent is extended or adjusted under 35 U.S.C. 154(b) by 0 days.

(21) Appl. No.: 13/318,330

(22) PCT Filed: Apr. 30, 2010

(86) PCT No.: PCT/US2010/001277
§ 371 (c)(1),
(2), (4) Date: Feb. 24, 2012

(87) PCT Pub. No.: WO2010/126604
PCT Pub. Date: Nov. 4, 2010

(65) Prior Publication Data
US 2012/0138748 A1 Jun. 7, 2012

Related U.S. Application Data

(60) Provisional application No. 61/214,932, filed on Apr. 30, 2009.

(51) Int. Cl.
*B64G 1/00* (2006.01)
*B64G 1/34* (2006.01)
*B64G 1/62* (2006.01)
*B64G 1/24* (2006.01)
*B64G 1/64* (2006.01)

(52) U.S. Cl.
CPC ........ *B64G 1/007* (2013.01); *B64G 1/62* (2013.01); *B64G 1/242* (2013.01); *B64G 1/648* (2013.01)

(58) Field of Classification Search
CPC ............ B64G 9/00; B64G 1/648; B64G 1/62; B64G 1/34; B64G 1/242; B64G 1/007
USPC .................................. 244/158.2, 158.1, 167
See application file for complete search history.

(56) References Cited

U.S. PATENT DOCUMENTS

| | | | |
|---|---|---|---|
| 4,834,325 A * | 5/1989 | Faget et al. | 244/159.4 |
| 6,116,544 A * | 9/2000 | Forward et al. | 244/158.2 |
| 6,173,922 B1 * | 1/2001 | Hoyt et al. | 244/158.2 |
| 6,286,788 B1 * | 9/2001 | Hoyt et al. | 244/158.2 |
| 6,290,186 B1 * | 9/2001 | Hoyt et al. | 244/158.2 |
| 6,386,484 B1 * | 5/2002 | Hoyt et al. | 244/158.2 |
| 6,419,191 B1 * | 7/2002 | Hoyt et al. | 244/158.2 |
| 6,431,497 B1 * | 8/2002 | Hoyt et al. | 244/158.2 |
| 6,732,978 B2 * | 5/2004 | Ockels et al. | 244/171.1 |
| 6,755,377 B1 * | 6/2004 | Levin et al. | 244/158.2 |
| 6,758,443 B1 * | 7/2004 | Levin et al. | 244/158.2 |
| 6,830,222 B1 * | 12/2004 | Nock et al. | 244/158.7 |
| 6,942,186 B1 * | 9/2005 | Levin et al. | 244/158.2 |
| 7,178,763 B2 * | 2/2007 | Licata | 244/158.2 |
| 2003/0213874 A1 * | 11/2003 | Ockels et al. | 244/172 |

* cited by examiner

*Primary Examiner* — Philip J Bonzell
(74) *Attorney, Agent, or Firm* — Arthur M. Dula; Scott L. Maddox; Law Office of Art Dula

(57) ABSTRACT

A deorbit device comprising a passive electrodynamic conductive tape connected at one end to a spacecraft.

17 Claims, 2 Drawing Sheets

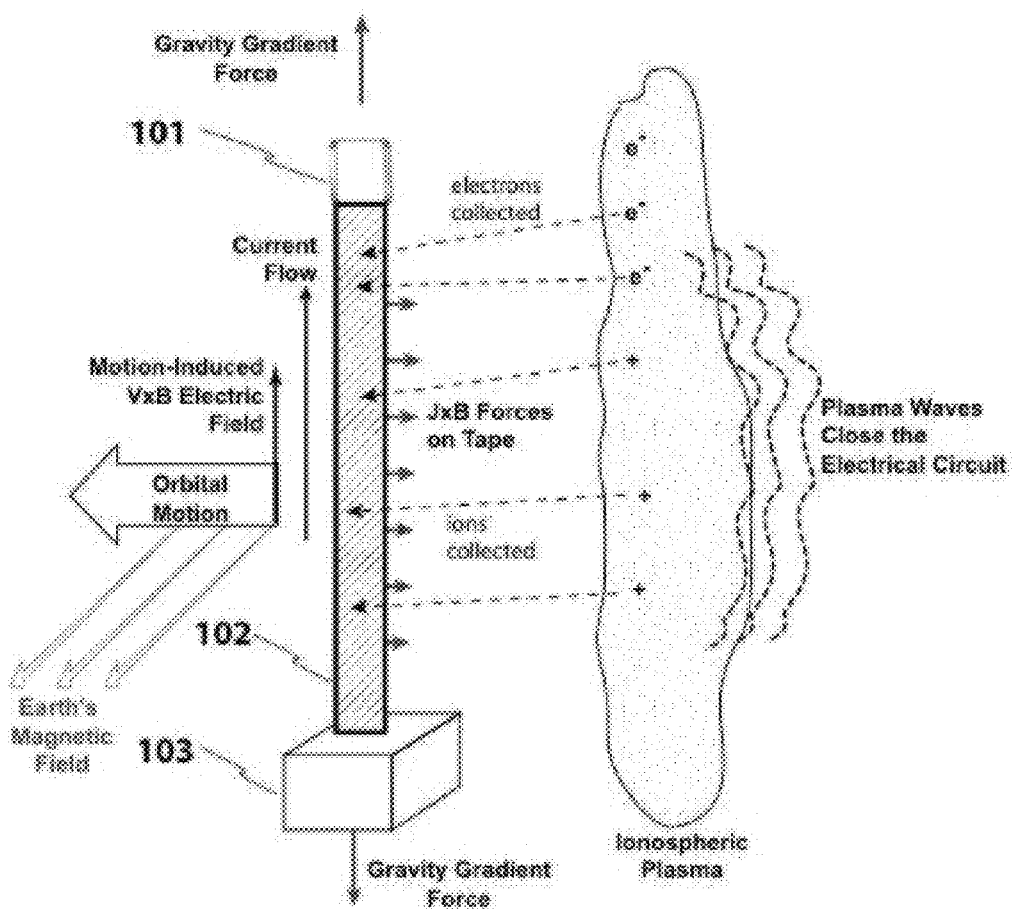

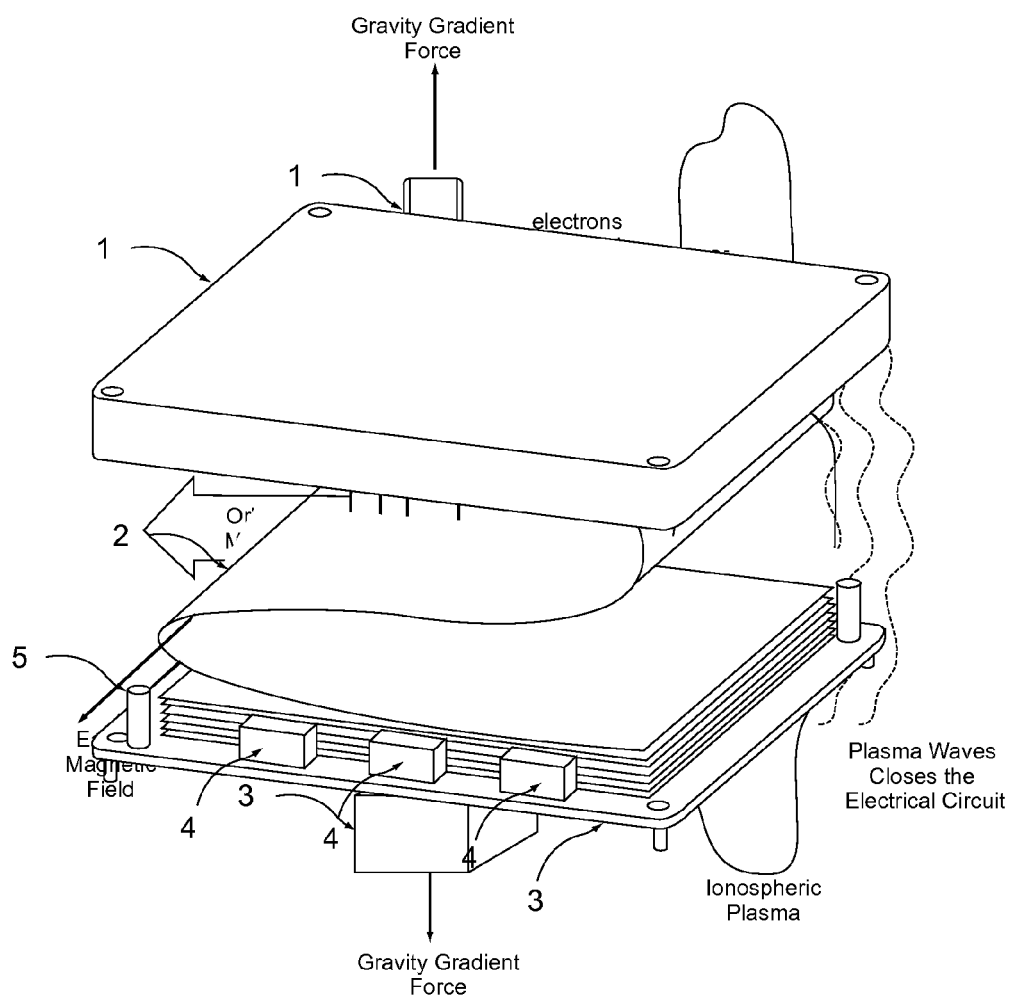

TERMINATOR TAPE SATELLITE DEORBIT MODULE

This invention was made with Government support under Contract No. FA953-09-M-0099 awarded by the U.S. Air Force. The Government has certain rights in the invention.

BACKGROUND

The invention relates generally to deorbit of spacecraft and more particularly to passive electrodynamic and aerodynamic drag.

Currently, satellite systems rely upon rockets for deorbit. This requires propellant masses reserved for deorbit that are a significant fraction of the spacecraft's dry mass.

Potential competitive devices may include other electrodynamic tether systems or inflatable or deployable drag-enhancement devices. The passive electrodynamic drag effect was first observed in the Echo balloon experiments.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION

One embodiment of the present invention provides a pizza-box shaped module attached to a spacecraft surface. When the spacecraft has completed its mission, the spacecraft can deploy 10 to several hundred meters length of conducting tape from the module. This tape will induce both increased aerodynamic drag and passive electrodynamic drag, hastening the orbital decay of the spacecraft.

The conductive tape could be made of any long, very thin, conductive material.

DRAWINGS

These and other features, aspects, and advantages of the present invention will become better understood when the following detailed description is read with reference to the accompanying drawings in which like characters represent like parts throughout the drawings, wherein:

FIG. 1 is a diagram showing the physics of spacecraft deorbit in accordance with an embodiment of the present invention.

FIG. 2 shows a terminator tape module sized for a 500-kg spacecraft in accordance with an embodiment of the present invention.

DETAILED DESCRIPTION

FIG. 2 shows a terminator tape module in accordance with an embodiment of the present invention comprising a box 3 with a lid 1, a separation mechanism 4 for releasing and pushing away the lid 1, and a length of conducting tape 2. Ideally the tape 2 is thin and conductive, comprising materials such as aluminized mylar or goldized kapton. The tape 2 may have additional conductive yarns, wires, and or high tenacity yarns embedded or bonded to it to increase conductivity, strength, and rip resistance. The tape 2 is folded up or wound up inside of the box 3, with one end connected to the lid 1 and the other end connected to the base of the box 3. Prior to launch of a spacecraft, the module would be mounted to a surface of the spacecraft. When it is time to dispose of the spacecraft, the module will be activated, and it will then eject its lid 1. The momentum imparted to the lid 1 will pull the tape 2 out of the box 3.

As shown in FIG. 1, gravity gradient forces will tend to orient the tape 2 along the local vertical direction. The tape 2 will significantly increase the aerodynamic drag area of the spacecraft, increased its rate of orbital decay due to neutral drag. In addition, it will induce electrodynamic drag to further hasten the spacecraft's deorbit. The motion of the conducting tape 2 across the Earth's magnetic field will induce a voltage along the tape 2, biasing the top and bottom of the tape 2 with respect to the local environment. The positively biased portion of the tape 2 will collect electrons from the conducting ionospheric plasma, and the negatively biased section of the tape 2 will collect positive ions from the plasma, resulting in a current flow along the tape 2. This current will interact back with the Earth's magnetic field, inducing a Lorentz force on the tape 2 that opposes its orbital motion. This passive electrodynamic drag' force will hasten the satellite's orbital decay.

As shown in FIG. 2, activation of the tape 2 deployment could be achieved by having the host spacecraft trigger a pyro- or wax-actuator based mechanism 4 to release the lid 1, allowing a set of springs 5 to push it away. Alternately, a 'watch-dog' avionics device 4 within the module could monitor signals from the host to determine when to activate, and trigger the release at the appropriate time.

In accordance with an embodiment of the present invention said conductive tape may incorporate stiffer materials such as superelastic wires that cause said conductive tape to exert force against being folded and thereby facilitate unfolding of the said conductive tape.

In accordance with an embodiment of the present invention, a release mechanism may comprise a small avionics board with a burn-wire that cuts a polymeric restraint line and a Non-Explosive Actuator (NEA) pin-puller, respectively. The release could also be accomplished using a pyro actuator, a wax-pellet actuator, a pneumatic device, or even an electric motor.

The folded-up conductive tape 2 has significant similarity to the Multi-Layer-Insulation (MLI) used on many spacecraft. The box 3 may comprise one or more spacecraft surfaces. An alternate implementation would be to eliminate the enclosing box 3, and instead fabricate MLI using a long tape 2 that is folded many times, and bound on its edges in such a way that after completion of the spacecraft's orbit, the tape 2 could be released to unfold. The tape 2 may attach directly to the spacecraft.

In accordance with an embodiment of the present invention said conductive tape may be perforated and have a sparse structure like a net.

A terminator tape module in accordance with an embodiment of the present invention could also be used as a device to absorb angular momentum to enable a spacecraft to recover from an uncontrolled tumble. It could also serve as a gravity-gradient boom and/or an antenna.

A terminator tape module in accordance with an embodiment of the present invention will primarily be useful within low-Earth-orbit altitudes (<2000 km). It will be less useful in GEO orbits.

A large conductive deployable structure such as a metalized balloon could perform a similar deorbit function. The present invention's preferred embodiment should be designed to maximize drag area and electrodynamic drag performance for a given mass. Compared to inflatable or deployable drag-enhancement devices the present invention's embodiments enable passive electrodynamic drag and offer enhanced aerodynamic drag. Using only passive electrodynamic drag lowers cost, mass, and risk associated with active electron emission devices used in electrodynamic drag systems. Using a tape structure permits better aerodynamic and electrodynamic drag than possible with an inflatable conducting balloon.

While the present invention's embodiments use similar physics to prior electrodynamic tether systems, implementation is significantly simplified. First, the form factor has been changed from a cylinder to a flat box. Second, a wide conductive tape with lengths on the order of 10 to several hundred meters is used, rather than a multi-kilometer long conducting tether. Third, whereas the prior electrodynamic tether systems used an active electron emission device at the cathode end of the system, the present invention's embodiments rely on passive collection of positive ions at the cathode end to balance electron collection at the anode end of the system.

Compared to prior electrodynamic tether systems, the present invention's embodiments' above use of passive electrodynamics simplifies implementation to reduce cost, mass, and technical risk.

In another embodiment of the present invention, to increase the electrodynamic drag generated by the conductive tape, solar cells or other photovoltaic materials could be integrated into the tape structure, at either end or anywhere along its length, to increase the voltage bias along the tape length and thereby increase the currents collected from the ionosphere.

In accordance with an embodiment of the present invention, to increase the electrodynamic drag generated by the conductive tape, electron emission devices, such as field emission array cathodes (FEACs), thermionic emitters, or photoemissive surface treatments could be integrated into the system at either or both ends of the tape.

In accordance with an embodiment of the present invention, the deorbit device may comprise conductive tape that is a dual function structure that serves as multi-layer insulation (MLI) during the satellite's operation, and then serves to deorbit the spacecraft when the conductive tape is deployed to serve as a drag device.

In accordance with an embodiment of the present invention, the deployment of the conductive tape may be accomplished by charging the conductive tape to high voltages so as to induce electrostatic repulsion forces that unfold the tape.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A deorbit device comprising:
 a foldable passive-electrodynamic conductive tape that ranges in length from ten to several hundred meters; and
 a flat box that is wide enough to accommodate said conductive tape's width so that said foldable passive-electrodynamic conductive tape can be folded to be stowed within said flat box; and
 wherein said foldable passive-electrodynamic conductive tape is connected at one end to a spacecraft.

2. The deorbit device of claim 1 further comprising an ejection spring configured to apply force to assist in deployment of said conductive tape.

3. The deorbit device of claim 1 wherein said conductive tape comprises multi-layer insulation (MLI) during the satellite's operation, and then is allowed to deploy or actuated to deploy to serve as a drag device.

4. The deorbit device claim 1 wherein deployment of said conductive tape is accomplished by charging the tape to a high voltage to induce electrostatic repulsion forces that unfold the tape.

5. The deorbit device of claim 1 wherein said conductive tape is perforated.

6. The deorbit device of claim 1 wherein said conductive tape comprises elastic materials that cause said conductive tape to exert force against being folded and facilitate unfolding said conductive tape.

7. The deorbit device of claim 1 wherein said foldable passive-electrodynamic conductive tape is connected at its other end to an endmass.

8. The deorbit device of claim 7 wherein said endmass comprises a cover plate.

9. The deorbit device of claim 1 further comprising a release mechanism.

10. The deorbit device of claim 9 wherein said release mechanism comprises an avionics board.

11. The deorbit device of claim 10 wherein said release mechanism further comprises a polymeric restraint line and a burn-wire that cuts said polymeric restraint line.

12. The deorbit device of claim 10 wherein said release mechanism further comprises a non-explosive actuator pin-puller.

13. The deorbit device of claim 10 wherein said release mechanism further comprises a pyro actuator.

14. The deorbit device of claim 10 wherein said release mechanism further comprises a wax-pellet actuator.

15. The deorbit device of claim 10 wherein said release mechanism further comprises a pneumatic device.

16. The deorbit device of claim 10 wherein said release mechanism further comprises an electric motor.

17. A deorbit device comprising: a foldable active-electrodynamic conductive tape connected at one end to a space craft, wherein said conductive tape further comprises an electron emission device, wherein said foldable active-electrodynamic conductive tape can be folded to fit within a relatively flat box; and
 said conductive tape ranges in length from ten to several hundred meters.

* * * * *